(12) United States Patent
Miyazawa et al.

(10) Patent No.: US 6,837,749 B2
(45) Date of Patent: Jan. 4, 2005

(54) CARD CONNECTOR WITH TERMINAL PROTECTION DEVICE

(75) Inventors: Junichi Miyazawa, Yokohama (JP); Shigeru Akiyama, Machida (JP)

(73) Assignee: Molex Incorporated, Lisle, IL (US)

( * ) Notice: Subject to any disclaimer, the term of this patent is extended or adjusted under 35 U.S.C. 154(b) by 0 days.

(21) Appl. No.: 10/482,761

(22) PCT Filed: Jun. 14, 2002

(86) PCT No.: PCT/US02/19033

§ 371 (c)(1),
(2), (4) Date: May 24, 2004

(87) PCT Pub. No.: WO03/003527

PCT Pub. Date: Jan. 9, 2003

(65) Prior Publication Data

US 2004/0198098 A1 Oct. 7, 2004

(30) Foreign Application Priority Data

Jun. 29, 2001 (JP) ........................................ 2001/199350

(51) Int. Cl.[7] .............................................. H01R 13/64
(52) U.S. Cl. ...................................... 439/677; 439/680
(58) Field of Search ................................ 439/677, 674, 439/680, 630

(56) References Cited

U.S. PATENT DOCUMENTS

| | | | | |
|---|---|---|---|---|
| 3,823,367 A | * | 7/1974 | Kaye et al. | 324/426 |
| 4,780,603 A | * | 10/1988 | Hamada | 235/492 |
| 5,036,430 A | * | 7/1991 | Hills | 361/684 |
| 6,511,350 B1 | * | 1/2003 | Ito et al. | 439/680 |
| 6,607,404 B1 | * | 8/2003 | Ito et al. | 439/630 |

* cited by examiner

*Primary Examiner*—Tho D. Ta
(74) *Attorney, Agent, or Firm*—Stacey E. Caldwell

(57) ABSTRACT

A memory card connector includes a housing mounting a plurality of terminals having contact portions for engaging contacts on one side of a memory card. A cover is mounted on the housing and defines a card receiving cavity therebetween for receiving the memory card in a given, normal orientation. A displacement rib is provided on the housing for displacing the memory card toward the cover and away from the contact a portions of the terminals if the memory card is inserted into the cavity in an abnormal orientation.

4 Claims, 4 Drawing Sheets

CARD CONNECTOR WITH TERMINAL PROTECTION DEVICE

FIELD OF THE INVENTION

This invention generally relates to the art of electrical connectors and, particularly, to a memory card connector. The invention is specifically directed to a system of protecting the terminals of the card connector against incorrect or abnormal insertion of the memory card into the connector.

BACKGROUND OF THE INVENTION

Memory cards are known in the art and contain intelligence in the form of a memory circuit or other electronic program. Some form of card reader reads the information or memory stored on the card. Such cards are used in many applications in today's electronic society, including video cameras, smartphones, music players, ATMs, cable television decoders, toys, games, PC adapters and other electronic applications. Typically, a memory card includes a contact or terminal array for connection through a card connector to a card reader system and then to external equipment. The connector readily accommodates insertion and removal of the card to provide quick access to the information and program on the card. The card connector includes terminals for yieldingly engaging the contact array of the memory card. Ejecting devices often are provided for facilitating inserting and ejecting the memory card to and from the card connector.

Card connectors of this type are disclosed in Japanese Utility Model Application Laid-Open No. Hei. 1-75983, Japanese Utility Model Application Laid-Open No. Hei. 1-150387 and Japanese Patent Application Laid-Open No. Hei. 11-135192.

One of the problems with such memory card connectors involves protecting the terminals of a connector in the event that a memory card is inserted in an incorrect or abnormal orientation. In other words, the contact or terminal array on the memory card typically is located along a front or leading edge of the card and on one side of the card, such as the bottom side of the card. The contacts may be located in recessed areas along the bottom front edge of the card. Of course, a correct or normal orientation of an inserted card has the contacts at the front bottom edge of the card. If the card is reversed in a backward or abnormal orientation, and the rear end of the card is inserted into the card connector, the terminals may be damaged or buckled because the rear end of the card is not provided with terminal recesses. Stop means may be provided on the connector housing to prevent such abnormal insertion of the memory card, but such stop means often can be overridden with excessive insertion forces. The present invention is direction to solving these problems with a new and improved terminal protection system in such card connectors.

SUMMARY OF THE INVENTION

An object, therefore, of the invention is to provide a new and improved memory card connector with an improved terminal protection system.

In the exemplary embodiment of the invention, the memory card connector includes a housing mounting a plurality of terminals having contact portions for engaging contacts on one side of a memory card. A cover is mounted on the housing and defines a card-receiving cavity therebetween for receiving the memory card in a given, normal orientation. Displacement means are provided on the housing for displacing the memory card toward the cover and away from the contact portions of the terminals if the memory card is inserted into the cavity in an abnormal orientation.

According to one aspect of the invention, the displacement means is provided by at least one cam rib on the housing in the path of insertion of the memory card into the cavity. The cam rib has an angled cam surface for engaging the memory card and biasing the card toward the cover away from the contact portions of the terminals. The cover preferably is fabricated of metal material and includes a thin plate portion defining a top of the cavity against which the memory card is displaced. The thin plate portion of the cover is yieldable away from the contact portions of the terminals as the memory card is displaced thereagainst.

According to another aspect of the invention, stop means are provided on the housing for engaging and stopping the memory card before the card engages the contact portions of the terminals if the memory card is inserted into the cavity in an abnormal orientation. As disclosed herein, the stop means is provided by at least one stop rib on the housing in the path of insertion of the memory card into the cavity. The stop rib has an abrupt stop surface for engaging and stopping the memory card. The stop surface is located for engaging the memory card prior to the card engaging the displacement means when the card is inserted into the cavity in the abnormal orientation. The displacement means, thereby, provides redundant protection for the contact portions of the terminals.

According to a further aspect of the invention, the memory card has contacts disposed in recesses in the one side of the card. The recesses open at the front or leading edge of the memory card. Therefore, the recessed contacts engage the contact portions of the terminals when the memory card is inserted into the cavity in the given, normal orientation of the card. The rear edge of the memory card engages the displacement means when the card is inserted into the cavity in a reverse or abnormal orientation.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

DETAILED DESCRIPTION OF THE PREFERRED EMBODIMENT

Figure 1:
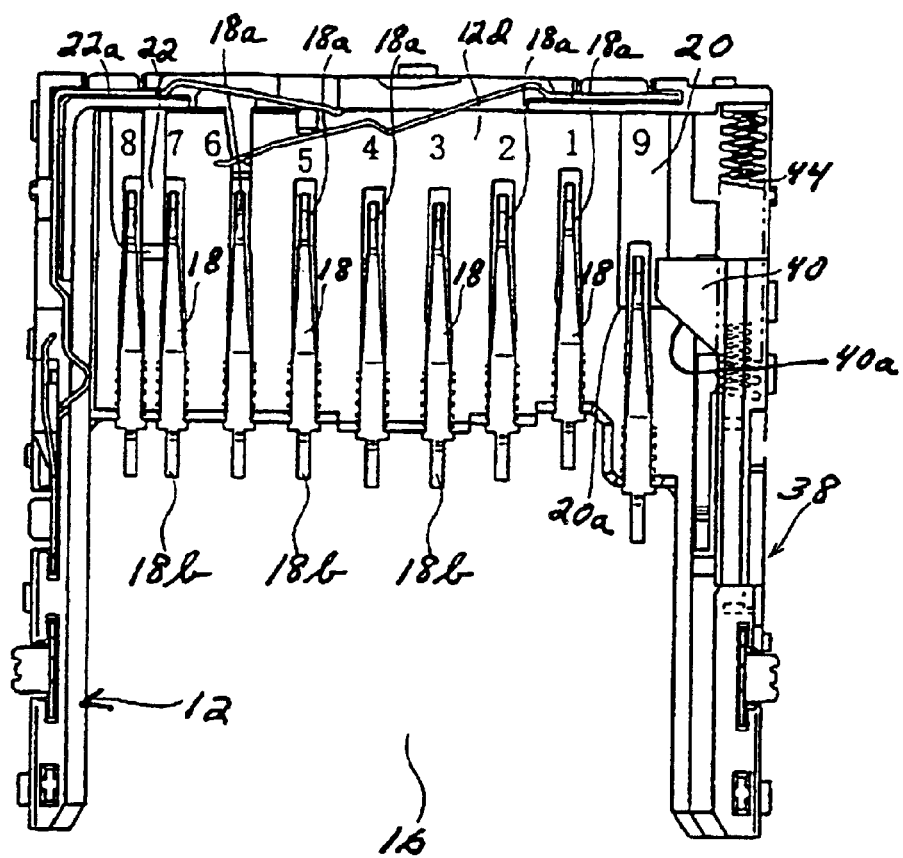
FIG. 1 is a top plan view of the housing of a card connector embodying the concepts of the invention, the cover having been removed from the housing to facilitate the illustration.

Referring to the drawings in greater detail, and first to "1 and 2, the invention is incorporated in a card connector, generally designated 10 (FIG. 2), which includes a housing, generally designated 12, and a cover, generally designated 14, which combine to define a card-receiving cavity 16 therebetween. The housing may be molded of dielectric material such as plastic or the like. The cover may be stamped and formed of sheet metal material or the like.

Housing 12 of connector 10 includes a bottom plate portion 12a, left and right sidewall portions 12b and 12c, respectively, and a terminal mounting portion 12d. The housing has a plurality of mounting posts 12e for mounting connector 10 on a printed circuit board.

Cover 14 includes a thin, upper plate portion 14a and left and right sidewall portions 14b and 14c, respectively, overlying the left and right sidewall portions 12b and 12c, respectively, of the housing. The upper plate portion, therefore, is yieldable or flexible, for purposes described hereinafter. An opening 14d is formed in upper plate portion 14a to increase the flexibility thereof.

Figure 2:
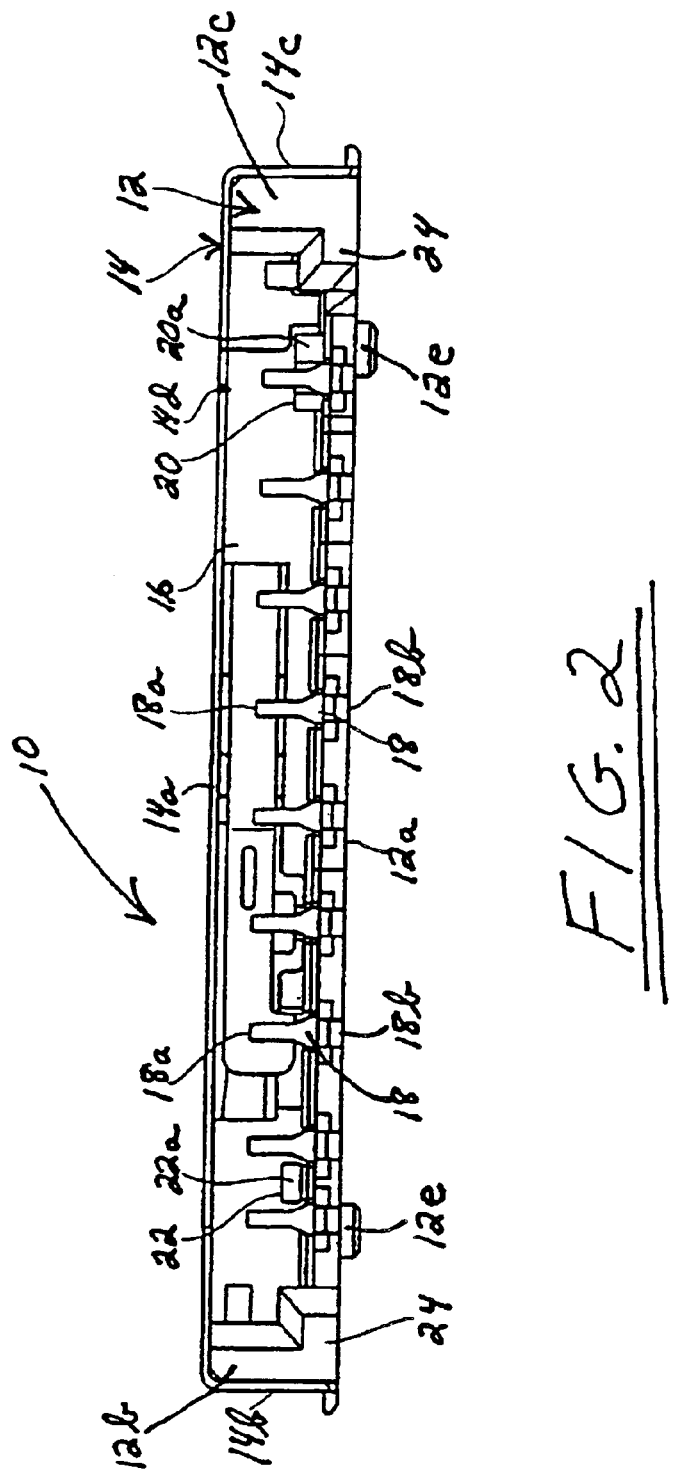
FIG. 2 is an enlarged elevational view of the card connector looking at the front or insertion end of the connector.

A plurality of terminals 18 are mounted in mounting portion 12d of housing 12 and are spaced transversely of the insertion direction of a memory card, as best seen in FIG. 1. The terminals have contact portions 18a which project upwardly from mounting portion 12d of the housing and into cavity 16 for engaging the contacts of the memory card as described hereinafter. The terminals have tail portions 18b for connection, as by soldering, to appropriate circuit traces on the printed circuit board. As can be seen in FIG. 2, the tail portions are generally flush with the bottom of the connector and away from card-receiving cavity 16.

Generally, stop means are provided on housing 12 for engaging and stopping a memory card before the card engages contact portions 18a of terminals 18, in the event that the card is inserted into cavity 16 in an abnormal orientation described hereinafter. Specifically, the stop means is provided by a stop rib 20 having an abrupt stop surface 20a in the path of insertion of the memory card into the cavity for stopping the memory card if the card is inserted in an abnormal orientation.

Generally, displacement means are provided on housing 12 for displacing the memory card toward upper plate portion 14a of cover 14 and away from contact portions 18a of terminals 18 if the memory card is inserted into the cavity in an abnormal orientation described hereinafter. Specifically, the displacement means is provided by a displacement or cam rib 22 having an angled cam surface 22a in the path of insertion of the memory card if the card is inserted into the cavity in the abnormal orientation. Angled cam surface 22a is effective to displace or bias the abnormally oriented memory card upwardly toward upper plate portion 14a of the cover and away from contact portions 18a of terminals 18. As stated above, upper plate portion 14a of the cover is flexible or yieldable and, thereby, can move upwardly as the abnormally oriented memory card is biased or displaced thereagainst.

Figure 3:
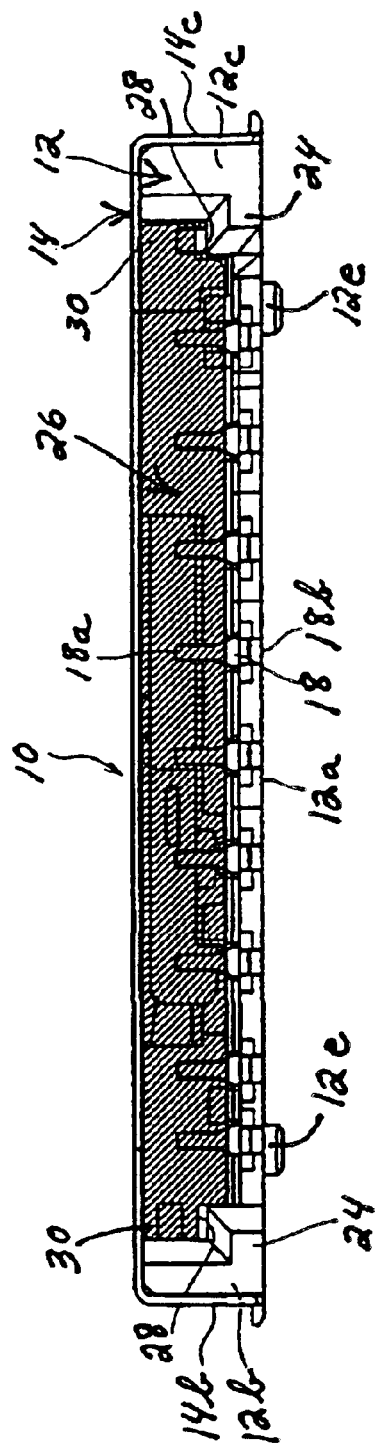
FIG. 3 is a view similar to that of FIG. 2, with a memory card being inserted into the connector and being shown as shaded in FIG. 3.

Referring to FIG. 3 in conjunction with FIG. 2, it can be seen that left and right sidewall portions 12b and 12c, respectively, of housing 12 are generally L-shaped to define bottom, inwardly directed flanges 24. A memory card, generally designated 26, is shown shaded in FIG. 3. The side edges of the memory card are stepped, as at 28, to define side ribs 30. This stepped configuration of the side edges of the memory card match the configurations to of L-shaped sidewall portions 12b and 12c of the housing, so that the memory card can be inserted into cavity 16 of the connector in only one vertical orientation as shown by the shaded depiction in FIG. 3.

Referring to "4(a)–4(c), memory card 26 has a front or leading end or edge 32 and a rear end or edge 34 as the memory card is inserted into card connector 10 in a given, normal orientation as indicated by arrow "A". In other words, the normal orientation of the card when inserted into the connector is with front or leading edge 32 inserted first into card-receiving cavity 16.

Still referring to "4(a)–4(c), memory card 26 has a plurality of contacts 36 on the bottom or underside of the card for engaging contact portions 18a of terminals 18 of the card connector. The terminals are disposed within recesses 38 in the bottom of the card, the recesses opening at leading edge 32 of the card. In order to fully understand the invention, it can be seen in FIG. 4(c) that the rear edge 34 of the card has no recesses and, in essence, forms a solid wall across the rear of the memory card.

Although not forming part of the specific invention herein, and referring back to FIG. 1, the card connector is provided with an eject device, generally designated 38, as is provided on many memory card connectors. The eject device includes a slider 40 having an angled surface 40a which engages an angled surface 42 (FIG. 4(a)) of the memory card whereby the slider and memory card move in unison into and out of the connector. A coil spring 44 biases slider 40 backwardly to a preload position of the memory card. The eject device may take various configurations including a "push-push" system which defines distinct forward or inserted and rearward or preload positions of the memory card.

Figure 4:
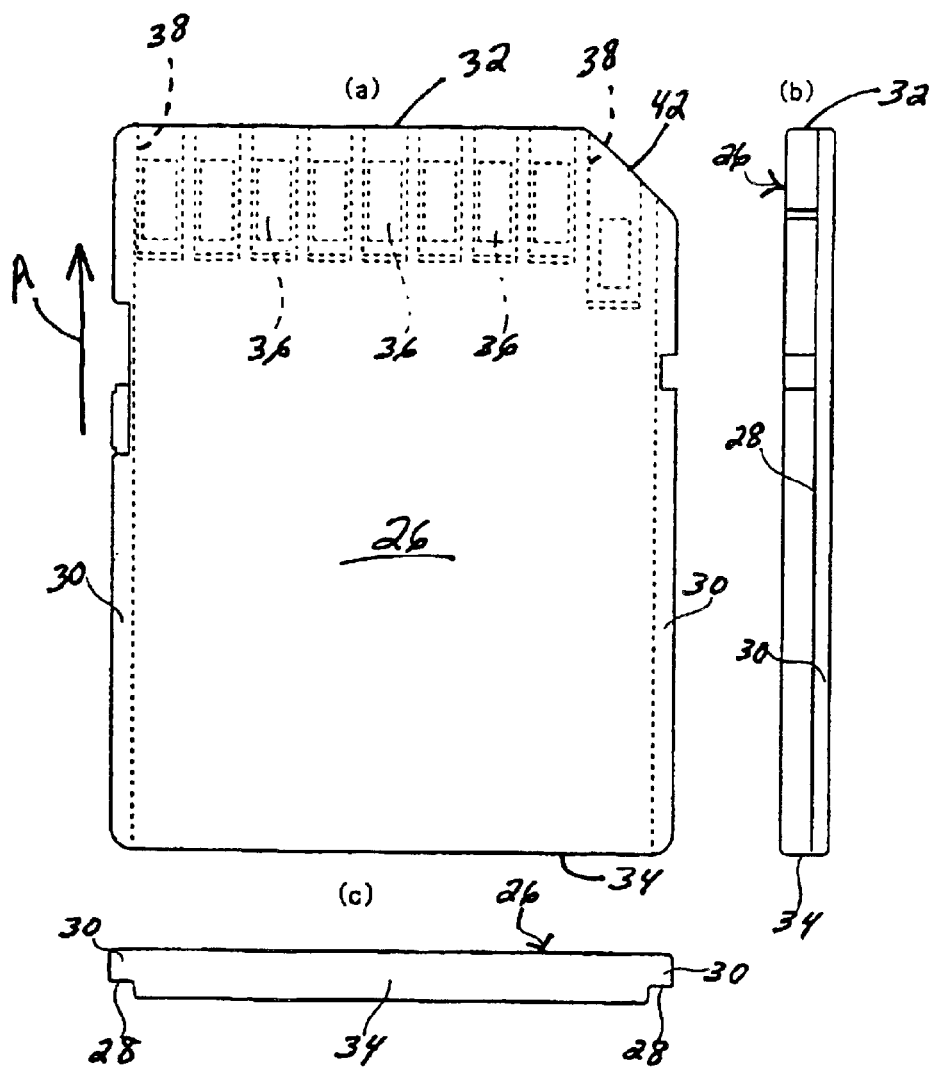
FIGS. 4(a)–4(c) are top plan, side elevational and rear elevational views of a memory card for use with the connector of "1–3.

In operation, when memory card 26 is inserted in the direction of arrow "A" (FIG. 4(a)), into card-receiving cavity 16 of card connector 10, the memory card is being inserted in its given or normal orientation. That is, front or leading edge 32 of the card is inserted first into the connector. When fully inserted, contacts 36 of the card will engage contact portions 18a of terminals 18. Stop rib 20 and displacement rib 22 will not interfere with insertion of the memory card in this normal orientation because they will move into recesses 38. However, if the memory card is turned-around backwardly, whereby an attempt is made to insert rear edge 34 of the card into cavity 16 and toward contact portions 18a of terminals 18, the solid wall defined by rear edge 34 will prevent full insertion of the card. First, the solid wall defined by rear edge 34 will abut stop surface 20a of stop rib 20. If considerable or excessive forces still are applied to the card in the insertion direction to overcome the resistance of stop surface 20a of stop rib 20, rear edge 34 of the card will engage angled cam surface 22a of displacement rib 22. The angled surface will bias or displace the memory card upwardly toward upper plate portion 14a of cover 14 and away from contact portions 14a of terminals 18. Being flexible, the upper plate portion of the cover can yield to allow the rear edge of the memory card to ride onto the top of displacement rib 22, whereby the memory card cannot damage the contact portions of terminals 18. Although displacement rib 22, with its angled cam surface 22a, is effective alone or in and of itself to protect the contact portions of the terminals, in the specific embodiment shown herein, the displacement rib actually provides redundant protection (in addition to stop rib 20) for the contact portions of the terminals. However, it should be understood that the invention contemplates that the displacement rib could be used in a connector without the stop rib.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

What is claimed is:

1. A memory card connector (10), comprising:

a housing (12) mounting a plurality of terminals (18) having contact portions (18a) for engaging contacts (36) on one side of a memory card (26);

a cover (14) mounted on the housing and defining a card-receiving cavity (16) therebetween for receiving the memory card in a given, normal orientation;

a displacement rib (22) on the housing and having angled cam surface (22a) in the path of insertion of the memory card (26) into the cavity (16) for engaging the memory card and biasing the card toward the cover (14) away from the contact portions (18a) of the terminals (18) if the memory card is inserted into the cavity in an abnormal orientation; and a stop rib (20) on the housing and having an abrupt stop surface (20a) in the path of insertion of the memory card (26) into the cavity (16) for engaging and stopping the memory card if the card is inserted into the cavity in the abnormal orientation, the stop surface (20a) of the stop rib (20) being located for engaging the memory card prior to the card engaging the angled cam surface (22a) of the displacement rib (20) whereby the displacement rib provides redundant protection for the contact portions of the terminals.

2. A combination of the memory card connector of claim 1 and a memory card (26), the memory card having contacts (36) disposed in recesses (38) in said one side of the card, the recesses (38) opening at a leading edge (32) of the memory card, whereby the recessed contacts engage the contact portions (18a) of the terminals (18) when the memory card is inserted into the cavity in said given, normal orientation, and a rear edge (34) of the memory card engages the displacement means (22) when the card is inserted into the cavity in said abnormal orientation.

3. The memory card connector of claim 1 wherein said cover (14) includes a thin plate portion (14a) defining a top of said cavity (16) against which the memory card is displaced.

4. The memory card connector of claim 3 wherein said cover (14) is fabricated of metal material, and the thin plate portion (14a) of the cover is yieldable away from the contact portions (18a) of the terminals (18) as the memory card (26) is displaced thereagainst.

* * * * *